United States Patent
Huang et al.

(10) Patent No.: US 12,454,489 B2
(45) Date of Patent: Oct. 28, 2025

(54) ALUMINA-BASED CERAMIC TOOL MATERIAL WITH LOW THERMAL EXPANSION AND PREPARATION PROCESS THEREOF

(71) Applicants: SHANDONG UNIVERSITY, Shandong (CN); YANSHAN UNIVERSITY, Hebei (CN)

(72) Inventors: Chuanzhen Huang, Qinhuangdao (CN); Zexin Li, Jinan (CN); Hanlian Liu, Jinan (CN); Zhenyu Shi, Jinan (CN); Peng Yao, Jinan (CN); Dun Liu, Jinan (CN); Hongtao Zhu, Jinan (CN); Bin Zou, Jinan (CN); Jun Wang, Shandong (CN); Zhen Wang, Qinhuangdao (CN); Longhua Xu, Qinhuangdao (CN); Shuiquan Huang, Qinhuangdao (CN); Meina Qu, Qinhuangdao (CN); Zhengkai Xu, Qinhuangdao (CN)

(73) Assignees: SHANDONG UNIVERSITY, Jinan (CN); YANSHAN UNIVERSITY, Qinhuangdao (CN)

( * ) Notice: Subject to any disclaimer, the term of this patent is extended or adjusted under 35 U.S.C. 154(b) by 583 days.

(21) Appl. No.: 17/955,237

(22) Filed: Sep. 28, 2022

(65) Prior Publication Data
US 2024/0067567 A1 Feb. 29, 2024

(30) Foreign Application Priority Data
Aug. 25, 2022 (CN) ............ 202211027605.0

(51) Int. Cl.
*C04B 35/117* (2006.01)
*B23B 27/14* (2006.01)
(Continued)

(52) U.S. Cl.
CPC .......... *C04B 35/117* (2013.01); *B23B 27/148* (2013.01); *C04B 35/6261* (2013.01);
(Continued)

(58) Field of Classification Search
CPC ................ C04B 35/117; C04B 2235/9607
See application file for complete search history.

(56) References Cited

U.S. PATENT DOCUMENTS 4,320,203 A * 3/1982 Brandt ............... C04B 35/117
501/153
5,017,524 A * 5/1991 Moskowitz ........ C04B 35/111
501/87
(Continued)

*Primary Examiner* — Alexandra M Moore
(74) *Attorney, Agent, or Firm* — Oliff PLC

(57) ABSTRACT

An alumina-based ceramic tool material with low thermal expansion and a preparation process thereof, accordingly, the ceramic tool material may have both the high hardness of alumina ceramics after the hot pressing sintering, and reduces the thermal expansion coefficient of the overall ceramic material by adding the $Sc_2W_3O_{12}$ as the negative thermal expansion phase, which improves the thermal shock resistance of ceramic tools in high-speed cutting engineering and meets the requirements of large temperature range during the machining of nickel-based superalloys. Moreover, the composite material does not use metal binder and has strong thermal stability even in the high-speed machining under extreme heat-force-chemistry coupling, so it has a high machining compatibility for nickel-based superalloys.

7 Claims, 3 Drawing Sheets

(51) Int. Cl.
*C04B 35/626* (2006.01)
*C04B 35/645* (2006.01)
(52) U.S. Cl.
CPC .... *C04B 35/6264* (2013.01); *C04B 35/62655* (2013.01); *C04B 35/645* (2013.01); C04B 2235/3206 (2013.01); C04B 2235/3217 (2013.01); C04B 2235/3224 (2013.01); C04B 2235/3258 (2013.01); C04B 2235/3856 (2013.01); C04B 2235/3886 (2013.01); C04B 2235/606 (2013.01); C04B 2235/656 (2013.01); C04B 2235/6581 (2013.01); C04B 2235/9607 (2013.01)

(56) References Cited

U.S. PATENT DOCUMENTS

| | | | | |
|---|---|---|---|---|
| 5,420,083 | A | * | 5/1995 | Brandt .................. C04B 35/117 |
| | | | | 501/97.4 |
| 2006/0009345 | A1 | * | 1/2006 | Suzuki ................. C01G 39/006 |
| | | | | 501/104 |

* cited by examiner

ALUMINA-BASED CERAMIC TOOL MATERIAL WITH LOW THERMAL EXPANSION AND PREPARATION PROCESS THEREOF

CROSS-REFERENCES TO RELATED APPLICATIONS

This application claims priority benefits to Chinese Patent Application No. 202211027605.0, filed 25 Aug. 2022, the contents of which are incorporated herein by reference.

TECHNICAL FIELD

The present invention belongs to the technical field of ceramic tools, and relates to an alumina-based ceramic tool material with low thermal expansion and a preparation process thereof.

BACKGROUND

The information disclosed in this background of the present invention section is only for enhancement of understanding of the general background of the present invention and should not necessarily be taken as an acknowledgement or any form of suggestion that this information forms the prior art already known to a person skilled in the art.

Ceramic tools have good red-hardness and can perform the cutting smoothly at a temperature as high as 1000° C., but typical workpiece materials soften to a large extent at this time, thus the ceramic tools have become one of the main tool materials for high-speed cutting superalloys. The ceramic tools have excellent high-temperature hardness; however, in the process of cutting nickel-based superalloys, the tool wear still exists due to the severe work hardening phenomenon.

SUMMARY

To solve the shortcomings of the existing technology, the present invention provides an alumina-based ceramic tool material with low thermal expansion and a preparation process thereof, by using the process method, which can efficiently prepare a ceramic tool material for processing nickel-based superalloys, reduce a coefficient of thermal expansion of ceramic materials, improve a thermal shock resistance of ceramic tools, and promote the cutting and processing research of difficult-to-machine materials such as nickel-based superalloys and so on.

In order to achieve the above purpose, the technical solutions of the present invention are as follows.

A first aspect, the present invention provides a preparation process of an alumina-based ceramic tool material with low thermal expansion, comprising the steps of:
(1) carrying out a ball milling on $Al_2O_3$ powder, $Sc_2O_3$ powder, WO 3 powder, Ti(C,N) powder and MgO powder individually;
(2) putting the $Al_2O_3$ powder, the $Sc_2O_3$ powder, the WO 3 powder, the Ti(C,N) powder and the MgO powder into milling pots separately, and carrying out the ball milling after adding appropriate amounts of anhydrous ethanol and alumina balls; drying the slurries obtained after the ball milling, and then obtaining a composite powder by sieving the powder formed after the slurries are dried; and
(3) pre-pressing the composite powder into a green body, and then vacuum hot pressing sintering the blank into an alumina-based ceramic tool material with low thermal expansion.

Further, a time for the ball milling in Step (1) is 48 h. The individual ball milling may make the powder material more homogeneous and avoid agglomeration.

Further, a ball-material ratio for the ball milling in Step (2) is 5:1 by mass.

Further, the drying in Step (2) is a vacuum drying at a drying temperature of 100° C.-120° C.

Further, by a mass fraction, the MgO powder is 3%-5%, the $Sc_2O_3$ powder is 1.5%-6%, the WO 3 powder is 7.5%-36%, the Ti(C,N) powder is 10%-30%, and the remaining amount is the $Al_2O_3$ powder.

Further, a pressure of the pre-pressure is 4-6 MPa.

Further, a heating process of the vacuum hot pressing sintering is: heating to 190° C.-210° C. at a first heating rate and then preserving the heat, and then heating to 1000° C. at a second heating rate and preserving the heat, and then heating to 1300° C.-1600° C. at a third heating rate and preserving the heat for a set time; in the heating process of the vacuum hot pressing sintering, first maintaining the pre-pressure on the green body, and when heating to 1000° C., starting to increase the pressure on the green body, uniformly increasing the pressure until an end of the heating, then maintaining the pressure.

Further, the first heating rate is 50° C./min; a time for preserving the heat after heating to 190° C.-210° C. is 10-15 min.

Further, the second heating rate is 40° C./min; a time for preserving the heat after heating to 1000° C. is 10-15 min.

Further, the third heating rate is 20° C./min; a time for preserving the heat after heating to 1300° C.-1600° C. is 20-50 min.

Further, during the temperature is increased from 1000° C. to 1300° C.-1600° C., a pressure speed for increasing the pressure on the green body is 2 MPa/min.

In the present invention, the MgO is selected as a sintering aid for a liquid-phase sintering, thus reducing the sintering temperature and accelerating the sintering.

In the present invention, the $Sc_2W_3O_{12}$ is selected as a negative thermal expansion phase, and the negative thermal expansion materials can be compounded with general positive thermal expansion materials to prepare materials with controlled thermal expansion coefficient or zero expansion. The thermal expansion coefficient is additive, and the negative expansion of the material is used to minimize the internal tensile stress of the high temperature material, to increase the thermal-impact resistance of the material, and to improve the fracture toughness of the ceramic tool.

Through experiments, it is found that if there is directly heated to 1500° C.-1600° C., a vacuum degree of the sintering process may not reach a required level, and a required degree of chemical reaction and phase change is weakened, and it is easier to produce many defects such as porosity and low density, which degrade the material performance. In the sintering procedure of the present invention, when the temperature rises to 190° C.-210° C., preserving the heat and maintaining the pressure for discharging the gas in the furnace cavity and on the surface of the raw material; when the temperature rises to about 1000° C., the material softens, then starting to increase the pressure uniformly; finally, preserving the heat at 1300° C.-1600° C. to complete the sintering.

A second aspect, the present invention provides an alumina-based ceramic tool material with low thermal expansion, being obtained by using the above-mentioned preparation process.

A third aspect, the present invention provides an application of the above-mentioned alumina-based ceramic tool material with low thermal expansion in cutting processing.

The gaining effect of the present invention is as follows.

According to the present invention, the ceramic tool material may have both the high hardness of alumina ceramics after the hot pressing sintering, and reduces the thermal expansion coefficient of the overall ceramic material by adding the $Sc_2W_3O_{12}$ as the negative thermal expansion phase, which improves the thermal shock resistance of ceramic tools in high-speed cutting engineering and meets the requirements of large temperature range during the machining of nickel-based superalloys. Moreover, the composite material does not use metal binder and has strong thermal stability even in high-speed cutting process under extreme heat-force-chemistry coupling, so it has a high machining compatibility for nickel-based superalloys material.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
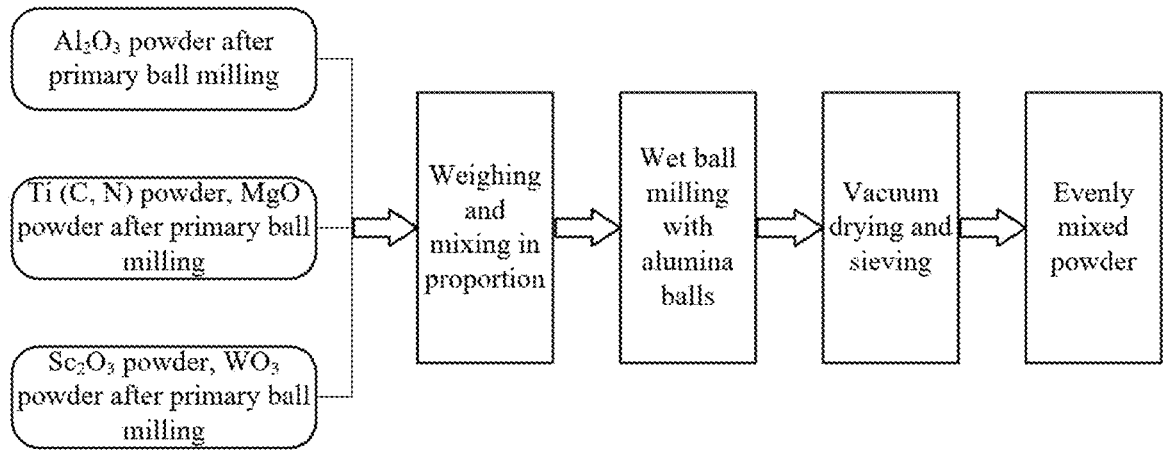
FIG. 1 is a flow chart of a preparation process of examples of the present invention.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

In view of the problem that the existing $Al_2O_3$ ceramic tool is easy to generate brittle damage and hot cracks in the continuous cutting process of nickel-based superalloys, the present invention proposes an $Al_2O_3$-based ceramic tool material with low thermal expansion and a preparation process thereof.

A typical embodiment of the present invention provides a preparation process of an alumina-based ceramic tool material with low thermal expansion, (comprising:) mixing evenly a slurry of sintering aids MgO, a slurry of $Al_2O_3$, a slurry of $Sc_2O_3$, a slurry of $WO_3$, and a slurry of Ti(C,N), obtaining a composite ceramic powder after drying the mixture, pre-pressing the composite ceramic powder into a green body, and vacuum hot pressing sintering the green body into an alumina-based ceramic tool material. A heating-up process of the vacuum hot pressing sintering is: heating to 190° C.-210° C. at a first heating rate and then preserving the heat for a set time, and then heating to 1000° C. at a second heating rate and preserving the heat for a set time, and then heating to 1300° C.-1600° C. at a third heating rate and preserving the heat for a set time; in the heating-up process of the vacuum hot pressing sintering, first maintaining a pre-pressure on the green body, and when the temperature is increased to 1000° C., starting to increase the pressure on the green body and maintaining the pressure, when the temperature is continuously increased from 1000° C., continuously increasing the pressure until an end of the heating-up, then maintaining the pressure.

In one or more examples of the present embodiment, by a mass fraction, the MgO is 3%-5%, the $Sc_2O_3$ is 1.5%-6%, the WO 3 is 7.5%-36%, the Ti(C,N) is 10%-30%, and the remaining amount is the $Al_2O_3$.

In one or more examples of the present embodiment, a mixing mode of the $Al_2O_3$, the $Sc_2O_3$, the MgO, the $WO_3$, and the Ti(C,N) is a ball milling.

In one or more examples of the present embodiment, the time for the ball milling of the mixed powder is controlled to 48 hours.

In one or more examples of the present embodiment, the drying is a vacuum drying.

In one or more examples of the present embodiment, conditions of the vacuum drying are: time of 2-4 hours and temperature of 100° C.-120° C.

In one or more examples of the present embodiment, the pressure of the pre-pressure is 4 MPa-6 MPa.

In one or more examples of the present embodiment, the first heating rise rate is 50° C./min. The time for preserving the heat after heating to 190° C.-210° C. is 10-15 min.

In one or more examples of the present embodiment, the second heating rate is 40° C./min. The time for preserving the heat after heating to 1000° C. is 10-15 min.

In one or more examples of the present embodiment, the third heating rate is 20° C./min. The time for preserving the heat after heating to 1300° C.-1600° C. is 20-50 min.

In one or more examples of the present embodiment, during the temperature is increased from 1000° C. to 1300° C.-1600° C., a pressure speed for increasing the pressure on the green body is 2 MPa/min.

In one or more examples of the present embodiment, heating to 1400° C. at the third heating rate. When the final temperature is in this range, the mechanical properties of the material are better.

Another embodiment of the present invention provides an alumina-based ceramic tool material with low thermal expansion, being obtained by adopting the above-mentioned preparation process.

A third embodiment of the present invention provides an application of an alumina-based ceramic tool material with low thermal expansion as described above in high speed machining.

In one or more examples of the present embodiment, the application is in high speed machining of nickel-based superalloys.

In order to enable those skilled persons in the art to understand the technical scheme of the present invention more clearly, the technical scheme of the present invention will be described in detail below in combination with specific embodiments.

Example 1

Figure 2:
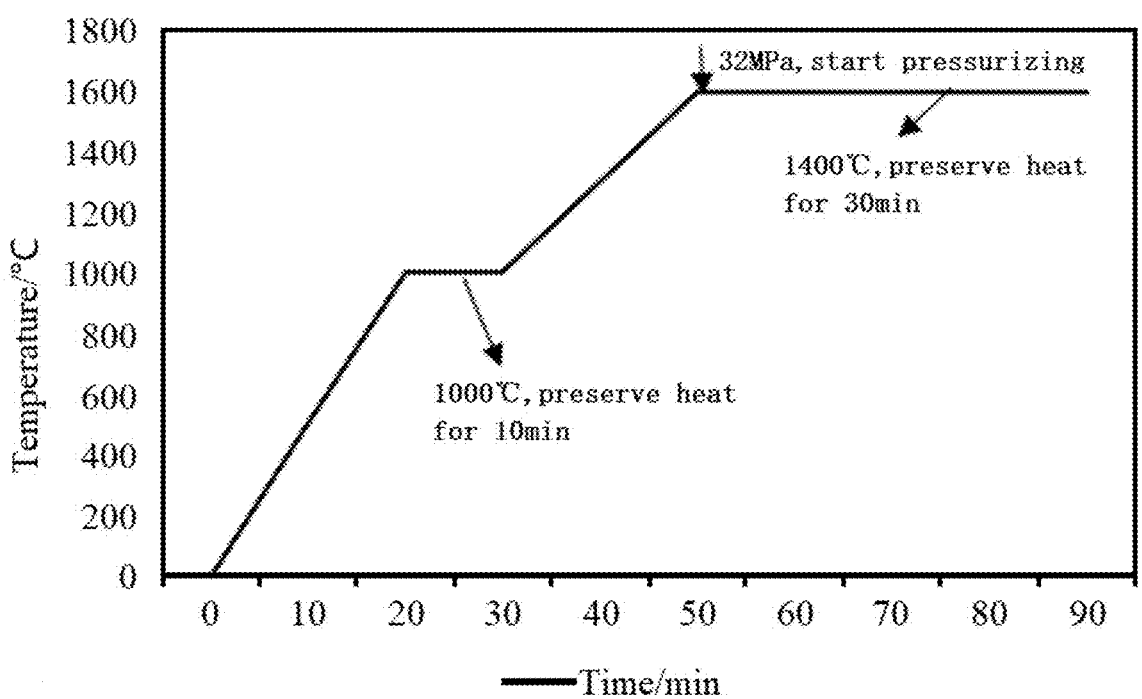
FIG. 2 is a diagram of a hot pressing sintering process of examples of the present invention.
Figure 3:
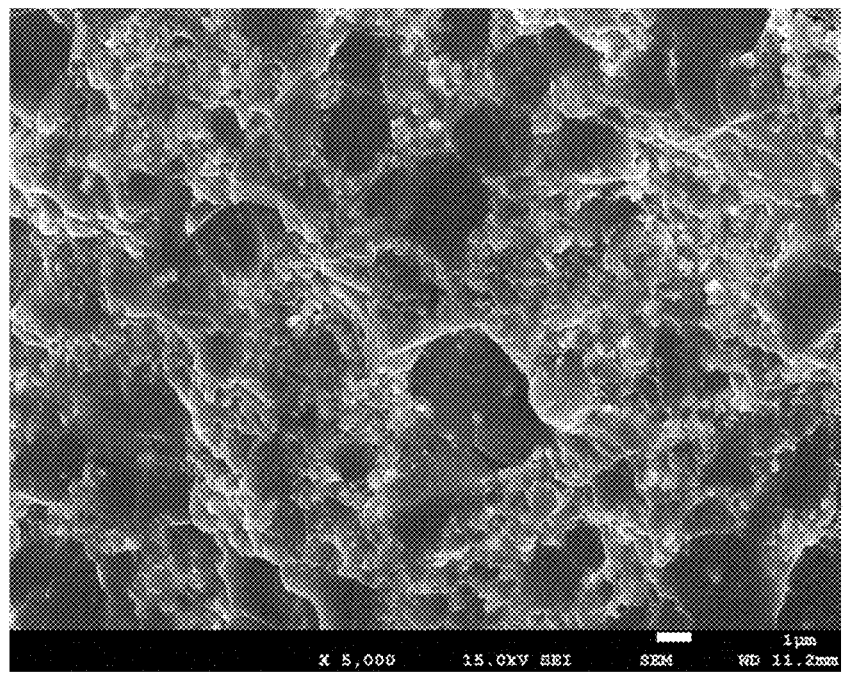
FIG. 3 is an SEM (Scanning Electron Microscope) diagram of an alumina-based ceramic tool material with low thermal expansion prepared in Example 1 of the present invention.
Figure 4:
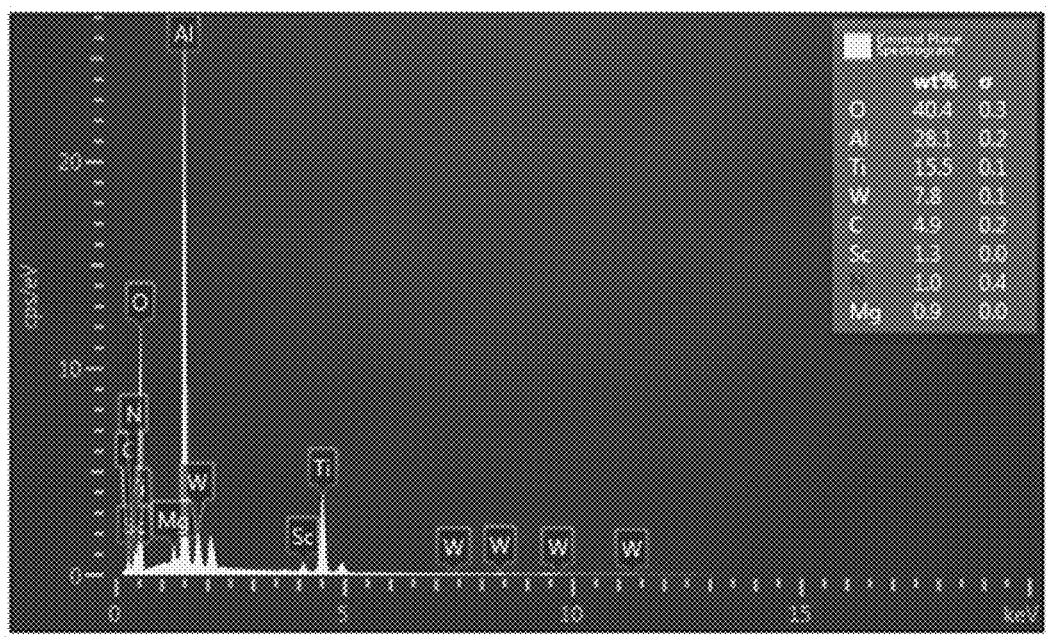
FIG. 4 is an EDS (Energy Dispersive Spectrometer) diagram of the alumina-based ceramic tool material with low thermal expansion prepared in Example 1 of the present invention.

An $Al_2O_3$-based ceramic tool material with low thermal expansion and a preparation process thereof, mainly comprising the steps of:
(1) primary ball milling: respectively putting $Al_2O_3$ powder, $Sc_2O_3$ powder, WO 3 powder, Ti(C,N) powder and MgO powder into a polyurethane ball milling pot, adding appropriate amounts of absolute ethyl alcohol and alumina pellets with different particle sizes, performing a high-speed ball milling for 48 hours by using a planetary ball mill, and bottling for later use;
(2) weighing: weighing according to a mass fraction, 40% of $Al_2O_3$ powder, 4.5% of $Sc_2O_3$ powder, 20.25% of $WO_3$ powder, 30% of Ti(C,N) powder and 3% of MgO powder;
(3) secondary ball milling: putting the weighed $Al_2O_3$ powder, $Sc_2O_3$ powder, WO 3 powder, Ti(C,N) powder and MgO powder into the polyurethane ball milling pot, adding appropriate amounts of absolute ethyl alcohol and alumina balls with different particle sizes, and performing the high-speed ball milling for 24 hours by using the planetary ball mill;
(4) drying: pouring the ball-milled uniform slurry into a stainless steel plate, and putting the stainless steel plate into a vacuum drying oven for drying for 3 hours at a drying temperature of 120° C.; then, sieving the dried powder through a 140-mesh stainless steel material sieve to obtain a ceramic composite powder, and for sintering later;

The preparation process of the $Al_2O_3$-based ceramic tool material with low thermal expansion is shown in FIG. 1.
(5) forming: pouring the powder of the ceramic tool into a graphite mould, and pre-pressing the powder into a cake green body by using a press or a jack, wherein the pressure of the pre-pressing is 4 MPa; and
(6) sintering: putting the cake green body into a sintering furnace for vacuum hot-press sintering, wherein a vacuum degree in the furnace is required to be lower than 0.01 MPa, and the hot-pressing sintering procedure is shown in FIG. 2, heating to 200° C. at a heating rate of 50° C./min, preserving the heat for 15 min to discharge the gas in the mould, then heating to 1000° C. at a heating rate of 40° C./min, preserving the heat for 10 min, and then heating to 1400° C. at a heating rate of 20° C./min, preserving the heat for 30 min; during this period, when the temperature is increased to 1000° C. and the material undergoes liquid phase sintering, uniformly increasing the pressure (a pressure speed for increasing the pressure is 2 MPa/min); after the heat preservation is completed, the sintered body is cooled along with the furnace to obtain the $Al_2O_3$- based ceramic tool material with low thermal expansion, and an EDS image and an SEM image thereof are shown in FIGS. 3 and 4.

Example 2

This example is the same as Example 1 except that: a final temperature of the vacuum hot pressing sintering is 1300° C.

Example 3

This example is the same as Example 1 except that: the final temperature of vacuum hot pressing sintering is 1500° C.

Example 4

This example is the same as Example 1 except that: the final temperature of vacuum hot pressing sintering is 1600° C.

Figure 5:
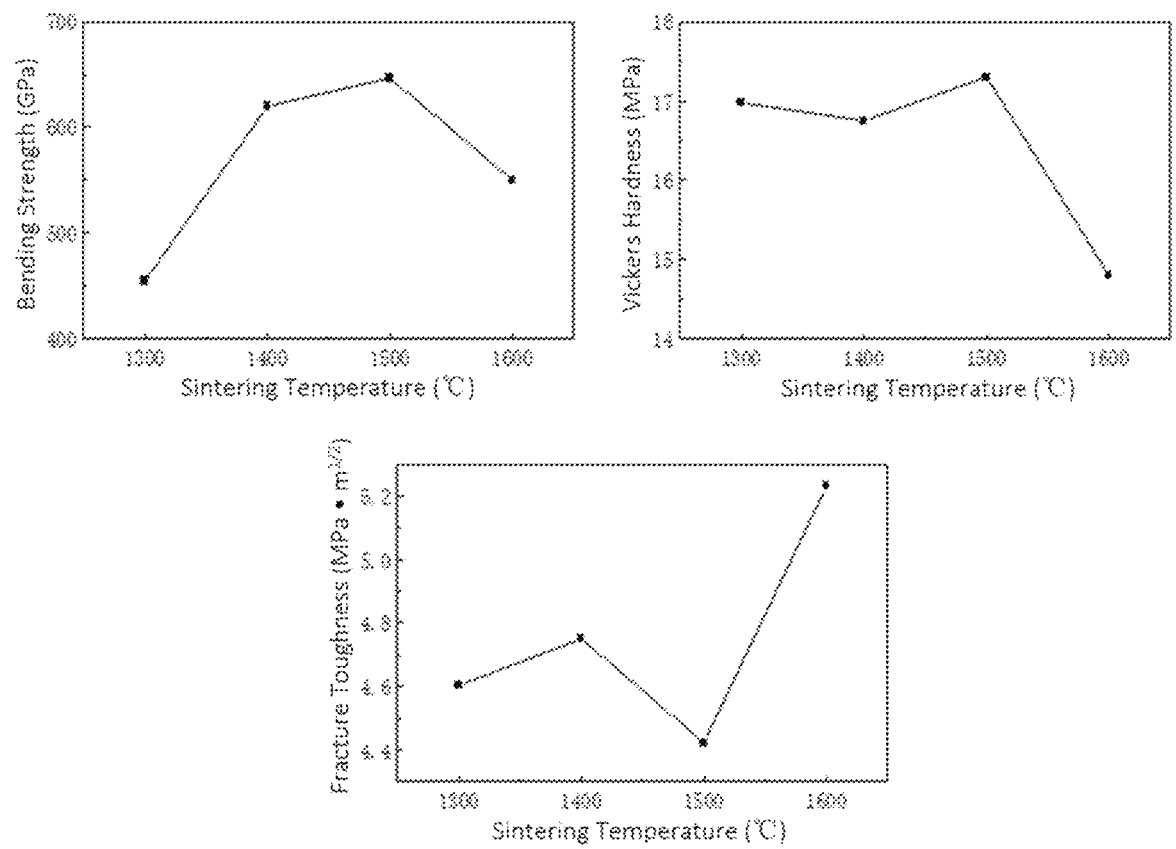
FIG. 5 shows the mechanical properties of the alumina-based ceramic tool material with low thermal expansion prepared in Examples 1 to 4 of the present invention.

The mechanical properties of the $Al_2O_3$-based ceramic tool material with low thermal expansion prepared in Examples 1 to 4 are shown in FIG. 5, and it can be seen from the Figure that the bending strength and Vickers hardness of the material are the highest when the sintering temperature is 1500° C.; and the fracture toughness of the material is the highest when the sintering temperature is 1600° C.

The foregoing descriptions are merely preferred embodiments of the present invention, but not intended to limit the present invention. A person skilled in the art may make various alterations and variations to the present invention. Any modification, equivalent replacement, or improvement made, etc. within the spirit and principle of the present invention shall fall within the protection scope of the present invention.

What is claimed is:
1. A preparation process of an alumina-based ceramic tool material, comprising the steps of:
(1) carrying out a primary ball milling on $Al_2O_3$ powder, $Sc_2O_3$ powder, $WO_3$ powder, Ti(C,N) powder and MgO powder individually;
(2) after the primary ball milling, adding the $Al_2O_3$ powder, the $Sc_2O_3$ powder, the $WO_3$ powder, the Ti(C,N) powder and the MgO powder into a milling pot, wherein a mass fraction of the MgO powder added into the milling pot is 3%-5%, a mass fraction of the $Sc_2O_3$ powder added into the milling pot is 1.5%-6%, a mass fraction of the $WO_3$ powder added into the milling pot is 7.5%-36%, a mass fraction of the Ti(C,N) powder added into the milling pot is 10%-30%, and a remaining amount added into the milling pot is the $Al_2O_3$ powder, and carrying out a secondary ball milling after adding appropriate amounts of anhydrous ethanol and alumina balls; drying the slurries obtained after the secondary ball milling, and then obtaining a composite powder by sieving the powder formed after the slurries are dried; and
(3) pre-pressing the composite powder into a green body, and then carrying out a vacuum hot-press sintering on the green body to obtain the alumina-based ceramic tool material.
2. The preparation process according to claim 1, wherein a time for the ball milling in Step (1) is 48 h.
3. The preparation process according to claim 1, wherein a ball-material ratio for the ball milling in Step (2) is 5:1 by mass.

4. The preparation process according to claim 1, wherein the drying in Step (2) is a vacuum drying at a drying temperature of 100° C.-120° C.

5. The preparation process according to claim 1, wherein a pressure of the pre-pressure is 4 MPa-6 MPa.

6. The preparation process according to claim 1, wherein a heating process of the vacuum hot pressing sintering is: heating to 190° C.-210° C. at a first heating rate and then preserving the heat, and then heating to 1000° C. at a second heating rate and preserving the heat, and then heating to 1300° C.-1600° C. at a third heating rate and preserving the heat for a set time; in the heating process of the vacuum hot pressing sintering, first maintaining the pre-pressure on the green body, and when heating to 1000° C., starting to increase the pressure on the green body, uniformly increasing the pressure until an end of the heating, then maintaining the pressure.

7. The preparation process according to claim 6, wherein during the temperature is increased from 1000° C. to 1300° C.-1600° C., a pressure speed for increasing the pressure on the green body is 2 MPa/min.

* * * * *